United States Patent [19]

Maus et al.

[11] Patent Number: 5,105,539
[45] Date of Patent: Apr. 21, 1992

[54] PROCESS FOR MANUFACTURING A HONEYCOMB BODY, IN PARTICULAR A CATALYST CARRIER BODY, FORMED OF A PLURALITY OF ENTWINED BUNDLES OF SHEET METAL

[75] Inventors: Wolfgang Maus, Bergisch Gladbach; Ludwig Wieres, Overath, both of Fed. Rep. of Germany

[73] Assignee: Emitec Gesellschaft Für Emissionstechnologie MBH, Lohmar, Fed. Rep. of Germany

[21] Appl. No.: 674,506

[22] Filed: Mar. 22, 1991

Related U.S. Application Data

[63] Continuation of PCT/EP89/00311, Mar. 22, 1989.

[30] Foreign Application Priority Data

Sep. 22, 1988 [DE] Fed. Rep. of Germany ....... 3832243

[51] Int. Cl.[5] ..................... B21D 53/00; B21K 29/00
[52] U.S. Cl. .................... 29/890; 228/173.6; 228/181; 422/180
[58] Field of Search ............. 29/890, 890.08; 228/181, 173.6; 422/180

[56] References Cited

U.S. PATENT DOCUMENTS 3,857,680  12/1974  Porta et al. ............... 29/890 X
3,890,104   6/1975  Della Porta et al. ........ 29/890 X
4,300,956  11/1981  Rosenberger et al. ...... 228/173.6 X
4,923,109   5/1990  Cyron ........................ 29/890 X

FOREIGN PATENT DOCUMENTS 0245736  11/1987  European Pat. Off.
0245737  11/1987  European Pat. Off.

Primary Examiner—Timothy V. Eley
Assistant Examiner—C. Richard Martin
Attorney, Agent, or Firm—Herbert L. Lerner; Laurence A. Greenberg

[57] ABSTRACT

A process for manufacturing a honeycomb body having a multiplicity of at least partly structured metal sheets defining a multiplicity of channels through which a fluid can flow includes stacking at least partly structured metal sheets into a plurality of bundles of metal sheets having ends. Each bundle is folded about a respective bending line defining a folded edge of each bundle and the folded edges are simultaneously or subsequently moved toward a central region. The ends of the folded bundles are entwined in the same direction, such as by rotating the central region and contracting a form surrounding the bundles. The entwined bundles are encased in a prefabricated jacket by pushing the entwined bundles into the prefabricated jacket or surrounding the entwined bundles with the prefabricated jacket.

13 Claims, 6 Drawing Sheets

PROCESS FOR MANUFACTURING A HONEYCOMB BODY, IN PARTICULAR A CATALYST CARRIER BODY, FORMED OF A PLURALITY OF ENTWINED BUNDLES OF SHEET METAL

CROSS-REFERENCE TO RELATED APPLICATION:

This application is a continuation of International Application PCT/EP89/00311, filed Mar. 22, 1989.

BACKGROUND OF THE INVENTION

1. Field of the Invention

The invention relates to a process for manufacturing a honeycomb body, in particular a catalyst carrier body, including a multiplicity of metal sheets at least some of which are structured and have a multiplicity of channels through which a fluid can flow.

2. Description of the Related Art

Published European Application 0 245 736 A1 discloses a honeycomb body in which the various layers of sheet metal extend in involute fashion in the outer region. Such a construction has major advantages in terms of durability in the face of alternating thermal stresses and other strains. Published European Application 0 245 737 A1, corresponding to U.S. Pat. No. 4,832,998 and pending U.S. application Ser. No. 322,722, filed Mar. 13, 1989, discloses a honeycomb body that is formed of a bundle of metal sheets entwined in opposite directions. Once again that structural form has great durability in the face of alternating thermal strains. Although such a form is simple to manufacture, it is not entirely symmetrical in its construction, which must be taken into consideration in various manufacturing steps and in further processing, and is not always suitable for flexible production of special cross sections and irregular cross-sectional shapes at favorable cost.

Although the shape described in Published European Application A 0 245 736 is symmetrical in its outer region, nevertheless the shaping of the central region and corresponding manufacture are relatively complicated.

It is accordingly an object of the invention to provide a process for manufacturing a honeycomb body, in particular a catalyst carrier body, formed of a plurality of entwined bundles of sheet metal, which overcomes the hereinaforementioned disadvantages of the heretofore-known processes of this general type, which produces a honeycomb body that is largely symmetrically constructed for regular cross-sectional shapes but is easy to manufacture, and in which the excellent properties in terms of withstanding alternating thermal stress and other strains are simultaneously retained. Furthermore, the process should enable the production of a basic structure of honeycomb bodies having special cross sections, and in particular irregular cross-sectional shapes, at favorable cost.

SUMMARY OF THE INVENTION:

With the foregoing and other objects in view there is provided, in accordance with the invention, a process for manufacturing a honeycomb body having a multiplicity of at least partly structured metal sheets defining a multiplicity of channels through which a fluid can flow, which comprises stacking a plurality of at least partly structured metal sheets into a plurality of bundles of metal sheets having ends; folding each bundle about a respective bending line defining a folded edge of each bundle, and moving the folded edges toward a central region; entwining the ends of the folded bundles in the same direction; and encasing the entwined bundles in a prefabricated jacket.

In accordance with another mode of the invention, there is provided a process which comprises moving the folded edges toward the central region while simultaneously folding the bundles or after folding the bundles.

In accordance with a further mode of the invention, there is provided a process which comprises entwining the ends of the folded bundles by rotating the central region and contracting a form or form body surrounding the bundles.

In accordance with an added mode of the invention, there is provided a process which comprises encasing the entwined bundles by pushing the entwined bundles into the prefabricated jacket or by surrounding the entwined bundles with the prefabricated jacket.

In accordance with an additional mode of the invention, there is provided a process which comprises stacking the metal sheets in the bundles with different heights and/or different lengths.

In accordance with a concomitant mode of the invention, there is provided a process which comprises carrying out the stacking step by laterally offsetting metal sheets of corresponding lengths into bundles with an at least partly parallelogram-like, trapezoidal or irregular cross section prior to folding.

Through the use of this method, a plurality of bundles each being formed of a plurality of metal sheets, at least some of which are structured, is stacked together, and each bundle is folded about one bending line and simultaneously or subsequently moved with its folded edge to a central region, which may also include an internal tube. The ends of the folded bundle are entwined about one another in the same direction, which can be carried out, for instance, by rotating the central region and contracting a shaped body surrounding the bundle. Finally, the thus-entwined bundles are pushed into a prefabricated jacket, or are enclosed by a jacket.

This makes it possible to use bundles of different heights and/or having sheets of different lengths. Additionally, the sheets in a bundle can also be laterally shifted relative to one another.

An advantage of the above-described manufacturing method is that in order to increase the production speed, three or more bundles can be produced simultaneously by different stacking machines and then combined toward a central region. This shortens the production time as compared with the manufacture of a honeycomb body from only one bundle.

The honeycomb body produced according to this method, which has a multiplicity of channels through which a fluid can pass and which is particularly suitable as a catalyst carrier body or for other applications in flowing media, is formed of a multiplicity of metal sheets, at least some of them being structured, which are disposed in a jacket. The particular structures which the various metal sheets have is not important for the present invention, but only that suitable flow channels are created for a fluid. In general, smooth and corrugated sheets are used in alternating layers for such honeycomb bodies, but the invention is also applicable in the same manner to metal sheets which are structured in other ways, and also extends to these applications. For example, metal sheets with oblique or arrow-shaped corrugations, especially those which are known in the prior art, can be used. Sheet structures which are oriented transversely or obliquely relative to the flow direction, or sheets having gaps or holes, can also be used. In any case, a honeycomb body produced with the method according to the invention is formed of at least three bundles of sheets, at least three of which are folded, each around a bending line in the central region of the honeycomb body, and in the folded state are entwined in the same direction around one another and around the central region with the bending lines. A construction of this kind avoids virtually all of the disadvantages that arose in previously known honeycomb bodies, and combines many advantages. For regular cross sections, such as a circle or regular polygon, a highly symmetrical structure can be attained, and with a suitable selection of the number of bundles it is also possible for all of the sheets to be of equal length and all of the bundles to form the same number of sheets. This makes the manufacturing process simpler and less expensive, and also results in low production tolerances, especially relating to possible deformation of the jacket. The novel structure does not restrict the use of known, advantageous steps for improving the properties of the honeycomb body, and in fact favors them. Any known joining techniques, such as brazing, welding, sintering or the like, can be used with the present construction as well. Form-locking joining of the sheets to one another and/or to the jacket are also possible. A form-locking connection is one which connects two elements together due to the shape of the elements themselves, as opposed to a force-locking connection, which locks the elements together by force external to the elements. If it is practical, forms having an end surface that is conical or round-conical in cross section can also be attained, so that a telescoping effect is attained by pushing out the central region of such a honeycomb body. All in all, in terms of production versatility and performance under alternating thermal strain, the present invention produces structures which combine the advantages of structures that have essential points that are described in Published European Applications 0 245 736 A1 and 0 245 737 A1.

If four or more folded, entwined bundles are used, then highly complicated cross sections can be well filled-out, as will be described in further detail in conjunction with the drawing.

The fundamental structure of the honeycomb body produced according to the method of the invention and its properties are retained even if a bundle extending through the central region of the honeycomb body is not folded, but has its ends entwined in common with the folded bundles. In that case, this one bundle approximately assumes the shape of an S, with the bending lines of the other bundles located in the curves of the S.

In the simplest case, the honeycomb body produced according to the invention can include alternately disposed substantially smooth and corrugated sheets. The sheets contact each other and/or said jacket at lines of contact, and the sheets are joined to one another and/or the jacket at least at some of the lines of contact by joining techniques, such as by brazing. Securing the ends of the sheets to the jacket is sufficient for all applications. However, the honeycomb bodies may be additionally brazed in a narrow circumferential region, or in discontinuous zones, or continuously, at one or both end faces or surfaces, to a depth of several millimeters.

As will be explained in detail in conjunction with the drawing, the present invention makes it possible to fill out regular cross sections with structured sheets in a particularly simple manner, and it is also possible to provide an internal tube. Many regular cross sections, such as hexagons, can unexpectedly be filled out by equal-height bundles of sheets of equal length, which provides extreme simplification of manufacture. In the present case, the length of a sheet, in the case of structured sheets, is intended to mean not the original length, but rather the length once the structure has been produced. When regular shapes are made from bundles of sheets of equal length, these sheets cannot all always be folded in the middle. Lateral shifting of the various sheets in each bundle may be necessary, so that before folding, the bundle has a cross section with an approximately parallelogram shape.

Markedly irregular cross-sectional shapes, such as will be described below in conjunction with the drawing, can also be attained with the method of construction of a honeycomb body according to the invention. Since both the height of each bundle and the length of each individual sheet in each bundle can be fundamentally freely selected, and sheets of different lengths can also be disposed in a bundle with different amounts of lateral offset, the construction according to the invention offers a very wide range of versatility for uniformly filling out the most varied cross sectional shapes. A suitable configuration of bundles and their bending lines can be arrived at for virtually any desired cross-sectional shape by skilled trial and error, optionally with computer support.

A further advantage of the method for producing a honeycomb body according to the invention, at least with round cross sections, is that the jacket is uniformly stressed over its entire circumference, so that it need not have any intrinsic resistance to deformation. This permits the manufacture of the jacket from very thin sheets in these cases. For example, the jacket may be formed of a sheet being 0.1 to 1.5 mm thick and preferably approximately 1 mm or less.

A step which is known to be advantageous, namely placing individual thicker layers of sheets between the other sheets, is also easily attainable. As is known, either thicker sheet metal can be used for these layers of sheets, or a multilayered configuration of identically structured thin sheets can be used. In principle, thicker layers of sheets of this kind can either be disposed in the interior or on the top or bottom of the various bundles. Furthermore, the bundles may be formed of smooth or structured sheets on the outside thereof, depending on which configuration proves to be more favorable in manufacture or in the resulting body.

Preferably, efforts will always be made to have smooth and corrugated layers of sheets resting on one another in the resulting body, so that the boundary between individual bundles will no longer be apparent in the outer region of the body. To this end, the side that is on the inside when a bundle is folded may also be formed of only half of one smooth or corrugated layer, ending approximately at the bending line. However, because of the slight thickness of the sheet metal layers, such as 0.03 to 0.06 mm, it does no harm if, for instance, two smooth sheet-metal layers rest on one another at the boundary between two bundles. In the ideal case, however, it will not be apparent from the outside whether or not a sheet-metal layer belongs to a particular bundle of the honeycomb body. This association can therefore be determined only from the bending line along which this sheet-metal layer is folded.

Other steps which are considered as characteristic for the invention are set forth in the appended claims.

Although the invention is illustrated and described herein as embodied in a process for manufacturing a honeycomb body, in particular a catalyst carrier body, formed of a plurality of entwined bundles of sheet metal, it is nevertheless not intended to be limited to the details shown, since various modifications may be made therein without departing from the spirit of the invention and within the scope and rang of equivalents of the claims.

The method of operation of the invention, however, together with additional objects and advantages thereof will be best understood from the following description of specific embodiments when read in connection with the accompanying drawings.

Figure 1:
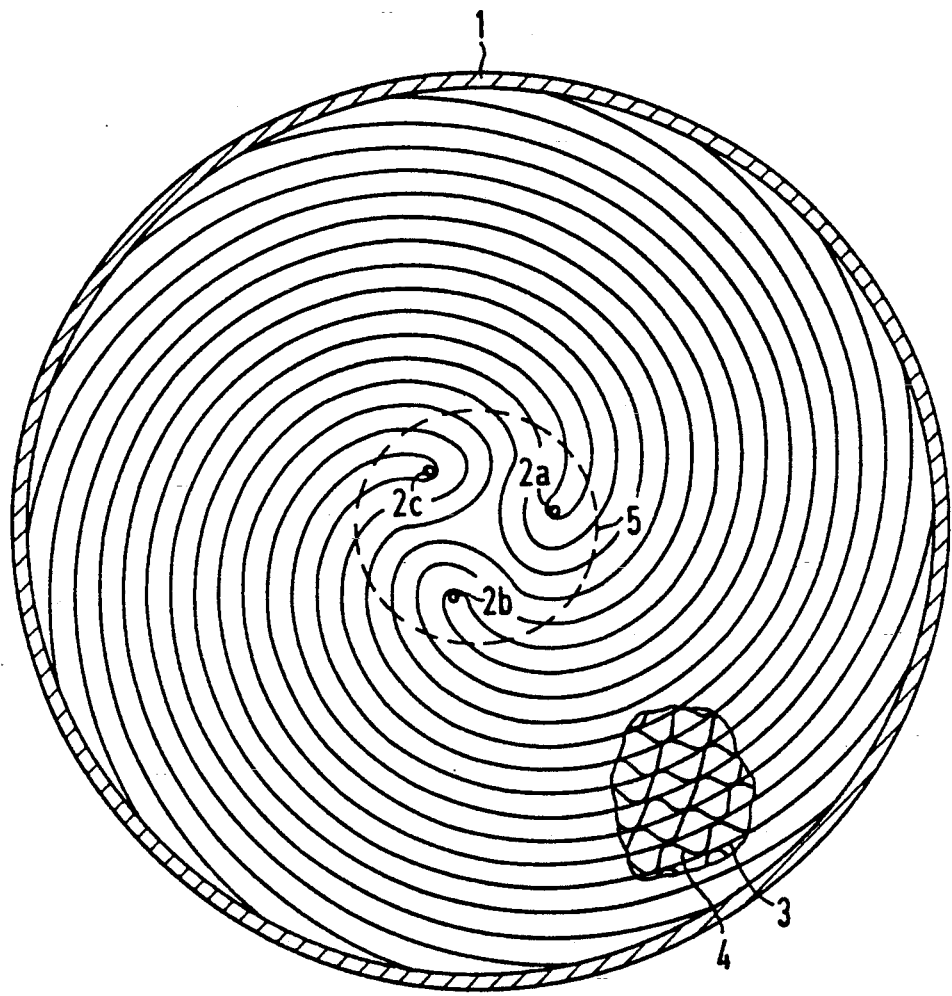
FIG. 1 is a diagrammatic, partly broken-away, cross-sectional view of a honeycomb body according to the invention.

DESCRIPTION OF THE PREFERRED EMBODIMENT:

Referring now to the figures of the drawing in detail and first, particularly, to FIG. 1 thereof, there is seen a a honeycomb body made up of smooth metal sheets 3 and corrugated metal sheets 4, which are disposed in a jacket or shell 1. In the outer region of the honeycomb body, the various sheet-metal layers follow an approximately involute course, while in its interior, bending lines 2a, 2b, 2c are provided, which are three in number in the present exemplary embodiment. One-third of the sheet layers contained in the honeycomb body are folded over each of these bending lines 2a, 2b, 2c and are then entwined about one another in the same direction in this folded state in the outer region.

Figure 2:
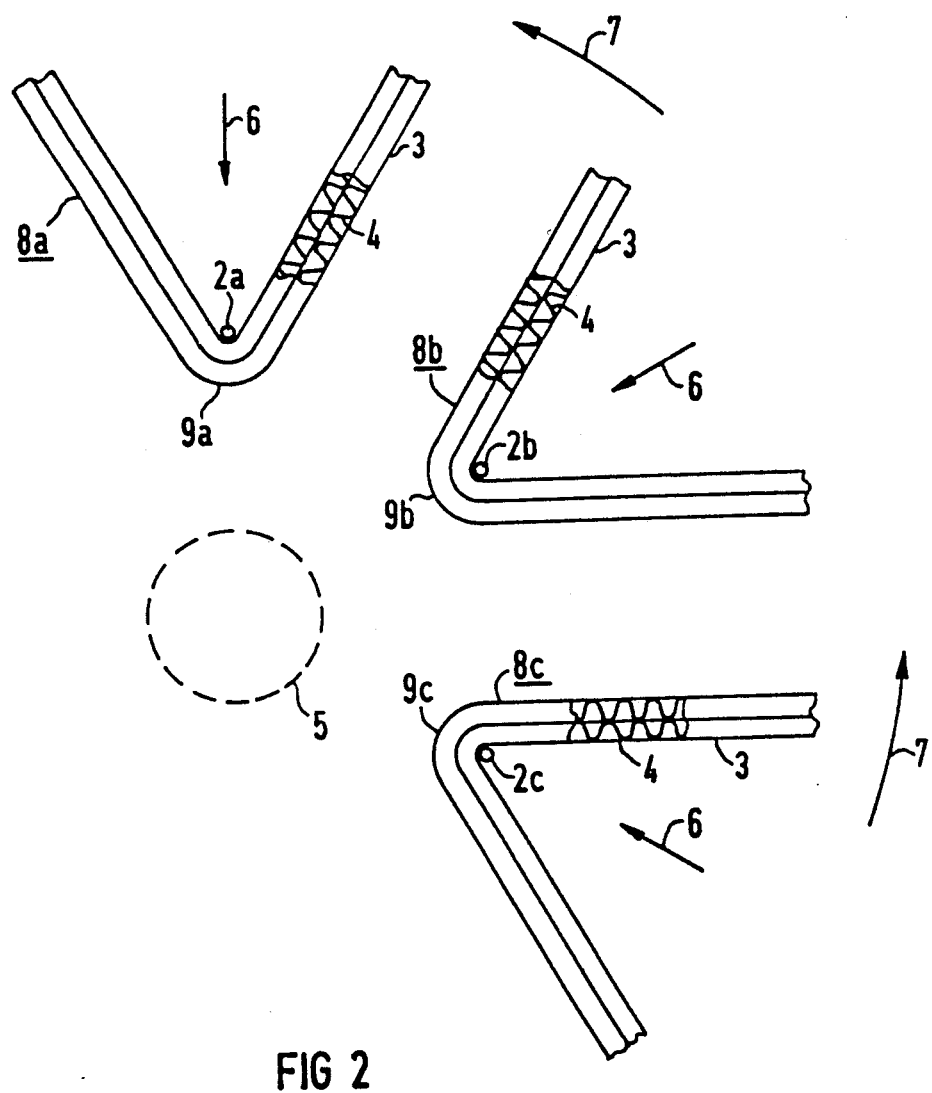
FIG. 2 is a fragmentary, partly broken-away, elevational view illustrating the production process.

The production of a honeycomb body according to the invention is diagrammatically illustrated in FIG. 2. A plurality of bundles 8a, 8b, 8c of metal sheets, only three bundles of which are shown in the figure, are each folded about a respective bending line 2a, 2b and 2c. Next, or preferably even simultaneously, resultant folded edges 9a, 9b, 9c are moved to a common central region 5, as indicated by arrows 6. The various sheet bundles 8a, 8b, 8c abut one another in the final position thereof, in the central region 5. As indicated by arrows 7, the ends of the folded bundles 8a, 8b, 8c can then be entwined about one another in the same direction. This can be accomplished by rotating the central region, for instance with a fork-like tool, and causing the contraction of a surrounding mold, and/or by holding the central region stationary and rotating a surrounding form that contracts in the process. Other options are also conceivable. In particular, the bending lines 2a, 2b, 2c can be made by fork-like tools which then also effect the entwining of the bundles by rotation.

Figure 3:
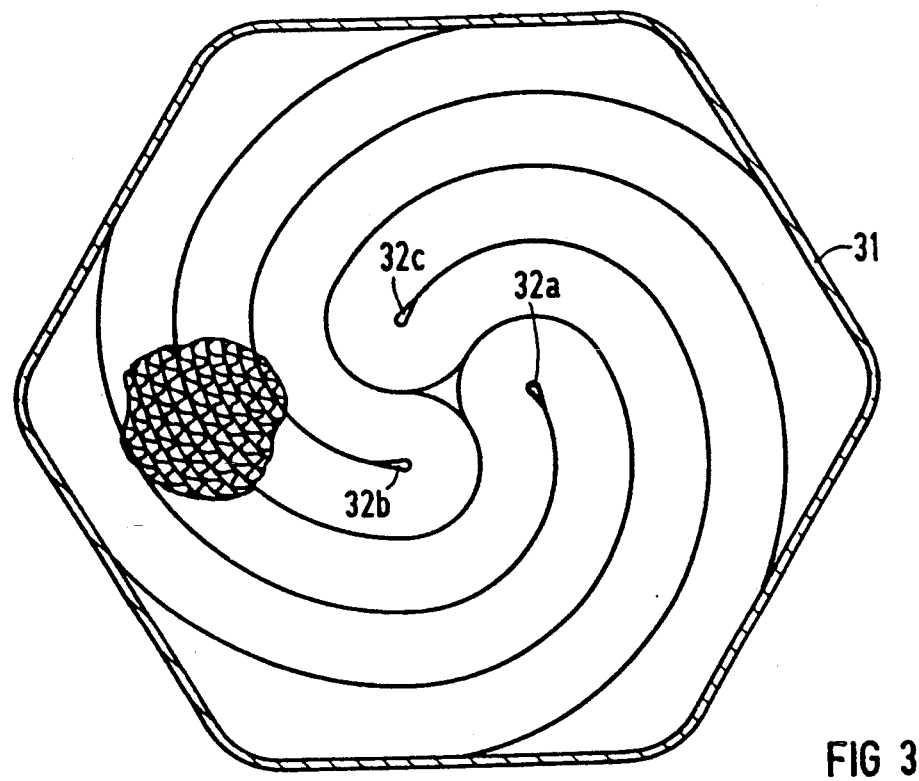
FIG. 3 is a view similar to FIG. 1 of a honeycomb body according to the invention having a hexagonal cross section.

FIG. 3 illustrates how a regular hexagon can advantageously be filled out with sheet-metal bundles. Three bundles are disposed inside a jacket 31 and are folded over bending lines 32a, 32b, 32c. Advantageously, the number of bundles used to fill out a regular polygon should equal the number of angles, or half that amount. As a result, a structure formed of bundles of equal height with sheets of equal length can be attained. The location of the bending lines with respect to the angles can also be varied in principle, and with polygons having an even number of angles it has proved advantageous to place the bending lines on the connecting planes of opposite edges of the jacket.

Figure 4:
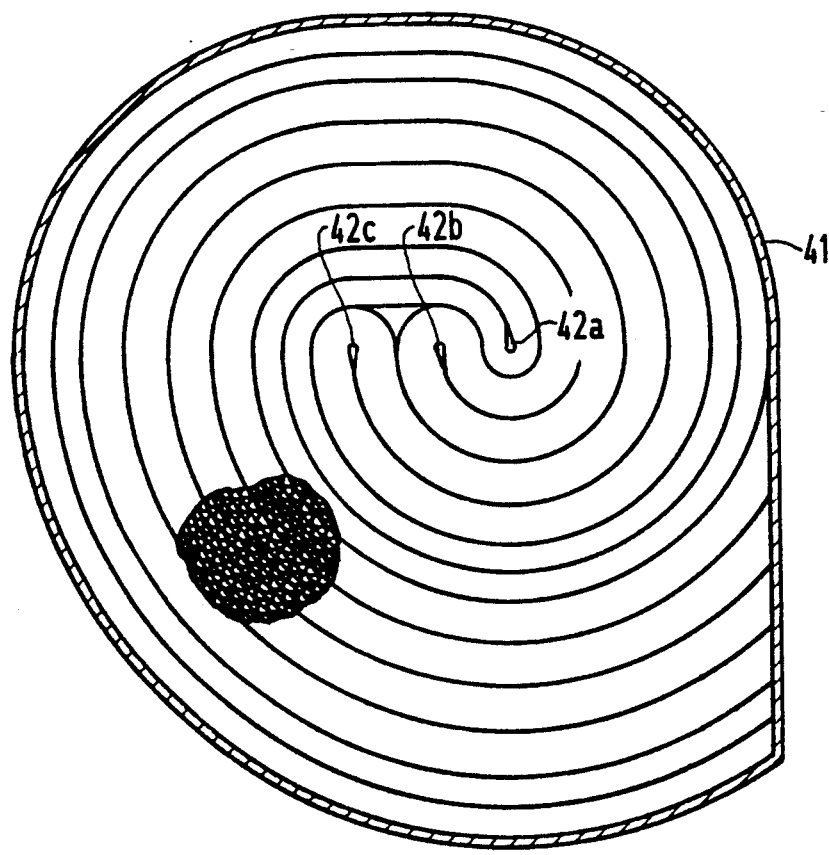
FIGS. 4 and 5 are other views similar to FIG. 1 of honeycomb bodies having irregular cross sections.

FIG. 4 shows an irregular cross-sectional shape of a honeycomb body reminiscent of a snail shell. A jacket 41 in this case can be filled out particularly favorably if one of the three bundles, namely the bundle folded over a bending line 42a, has a lesser height than two other bundles that are folded over the bending lines 42b, 42c. In such a case the three bending lines 42a, 42b, 42c are located approximately in the same plane.

Figure 5:
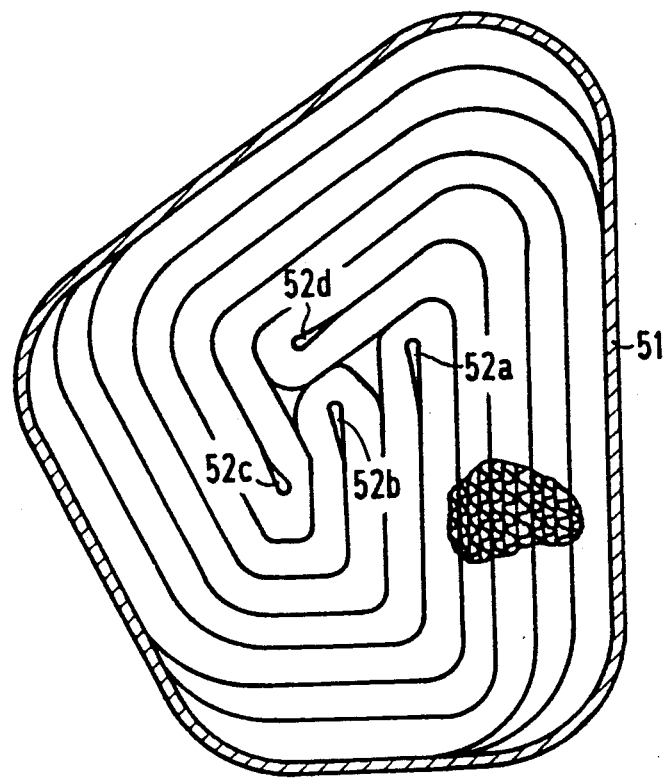

FIG. 5 shows an even more irregular cross-sectional shape of a jacket 51 and one of the options for filling this form with four bundles. Bending lines 52a, b, c, d are irregularly disposed in the central region of the honeycomb body, and this configuration can be optimized either by calculation or by systematic trial and error. It should be noted that the small remaining empty spaces seen in the drawing disappear virtually completely in actual manufacture, because the bundles and layers of sheets tend to deform and fill out such empty spaces.

Figure 6:
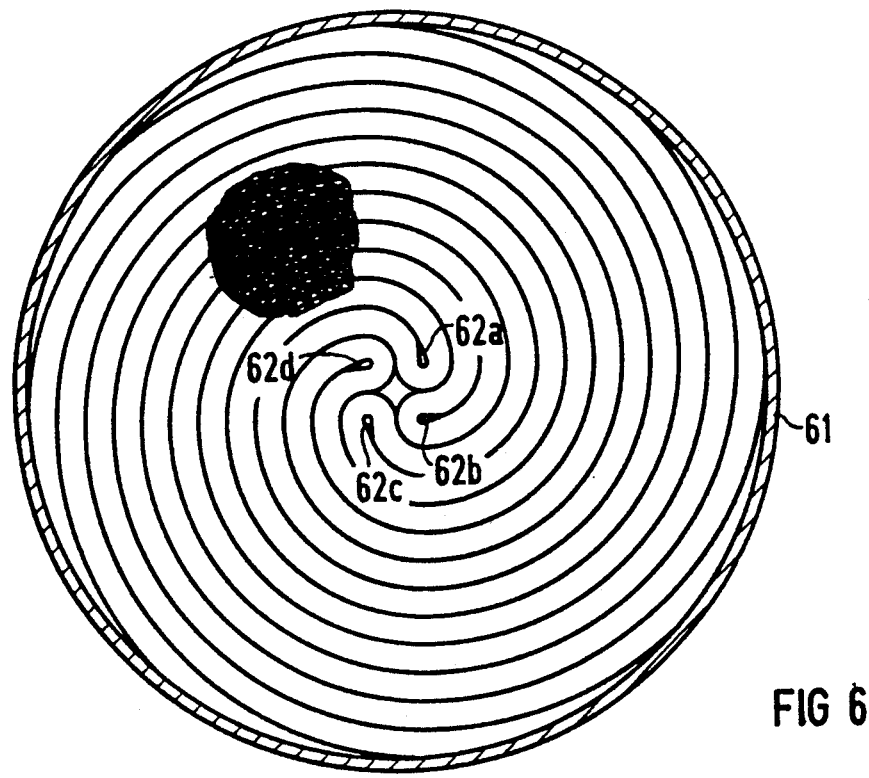
FIG. 6 is a view similar to FIG. 1 of a round honeycomb body made from four bundles.

FIG. 6 shows a highly symmetrical configuration of a round jacket 61, which is filled out with four bundles of sheets that are folded over bending lines 62a, b, c, d.

Figure 7:
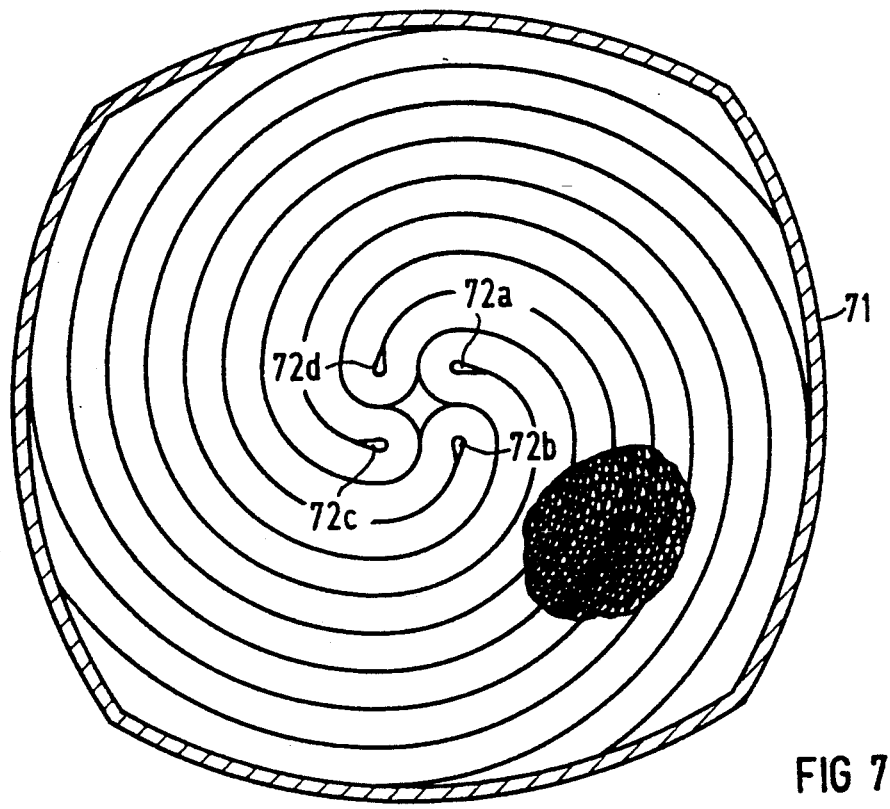
FIGS. 7 and 8 are other views similar to FIG. 1 of honeycomb bodies having regular cross sections of the type which result if a square or triangle is "inflated"

FIG. 7 shows a jacket tube 71 in the form of a distended or swollen square, which can again be filled with four bundles of sheets that are folded over bending lines 72a, b, c, d without difficulty.

Figure 8:
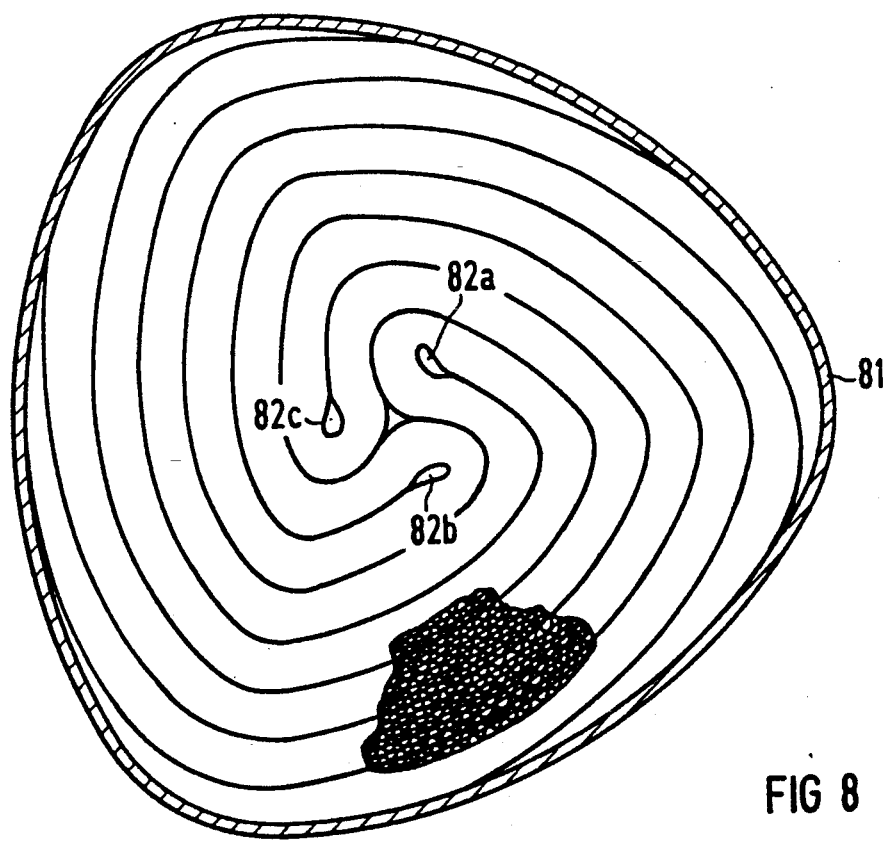

FIG. 8 shows a jacket 81 having the form of a distended or swollen triangle, which is filled with three bundles of sheets that are folded over bending lines 82a, b, c. In this case the bending lines 82a, b, c are each located on the side of the center line of the body opposite a respective edge of the body. This configuration is generally suitable for regular polygons having an odd number of sides, and for the cross-sectional shapes produced from them by distending or swelling them.

Figure 9:
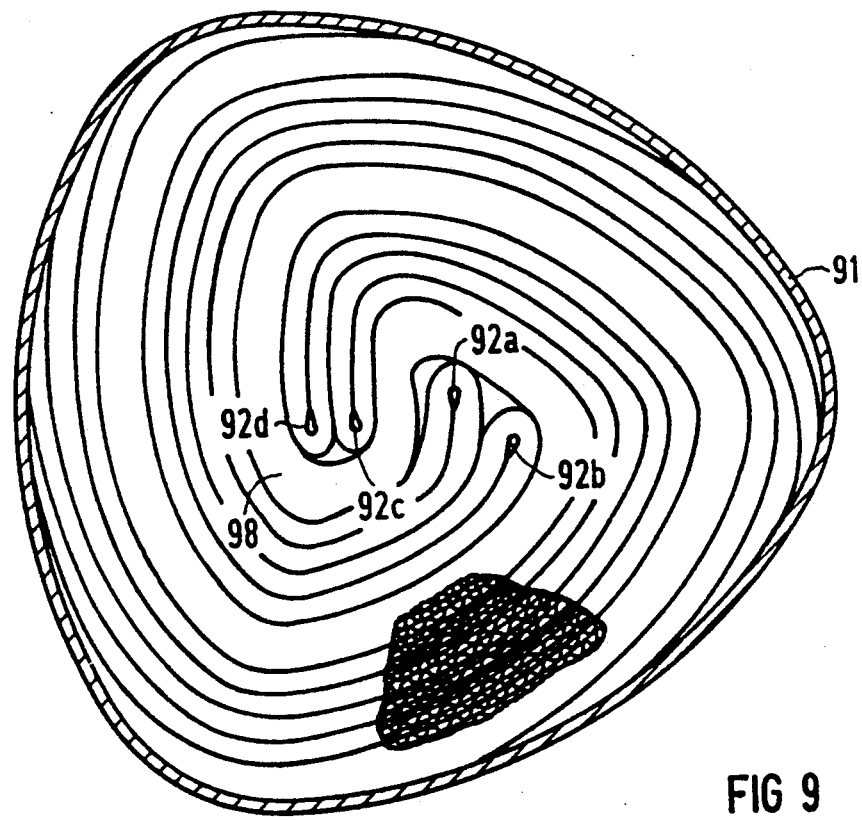
FIG. 9 is again a view similar to FIG. 1 of a honeycomb body having the same cross section as in FIG. 8, but filled out using an additional unfolded bundle.

FIG. 9 shows an example of how an unfolded bundle 98 can be integrated in honeycomb bodies made according to the invention. In the illustrated case, a jacket 91 has the same shape as in FIG. 8, but is filled with four bundles 98 that are folded over bending lines 92a, b, c, d, and one unfolded bundle 98. It can be seen that an unfolded bundle 98 in such a configuration could always be replaced with two folded bundles abutting one another with their folded edges in the central region. However, in honeycomb bodies that are actually to be made from five or more bundles, two folded bundles should always be replaced by one unfolded bundle that is twice as thick. This does not alter the fundamental advantages of the structure, but is simply a question of production engineering.

The present invention is particularly suitable for catalyst carrier bodies for thermally heavy duty in motor vehicles, but is not limited to this field of application, because such honeycomb bodies can also be used in other fields, for instance in handling flowing fluids.

We claim:

1. A process for manufacturing a honeycomb body having a multiplicity of metal sheets defining a multiplicity of channels through which a fluid can flow, which comprises:
   (a) stacking metal sheets into at least three separate bundles of metal sheets having ends;
   (b) moving the bundles toward a central region and bending each bundle about a respective one of at least three bending lines defining a bend in each bundle;
   (c) entwining the ends of the bundles in the same direction; and
   (d) encasing the entwined bundles in a prefabricated jacket.

2. The process according to claim 1, which comprises moving the bundles toward the central region while simultaneously bending the bundles.

3. The process according to claim 1, which comprises moving the bundles toward the central region after bending the bundles.

4. The process according to claim 1, which comprises entwining the ends of the bundles by rotating the central region and contracting a form surrounding the bundles.

5. The process according to claim 1, which comprises encasing the entwined bundles by pushing the entwined bundles into the prefabricated jacket.

6. The process according to claim 1, which comprises encasing the entwined bundles by surrounding the entwined bundles with the prefabricated jacket.

7. The process according to claim 1, which comprises stacking the metal sheets into bundles with different heights 8. The process according to claim 1, which comprises stacking metal sheets with different lengths.

9. The process according to claim 1, which comprises stacking metal sheets with different lengths into bundles with different heights.

10. The process according to claim 1, which comprises carrying out the stacking step by laterally offsetting metal sheets of substantially equal lengths into bundles with a parallelogram-like cross section prior to bending.

11. The process according to claim 1 which comprises carrying out the stacking step by laterally offsetting metal sheets of varying lengths into bundles with an at least partly trapezoidal cross section prior to bending.

12. The process according to claim 1, which comprises carrying out the stacking step by laterally offsetting metal sheets into bundles with an irregular cross section prior to bending.

13. The process according to claim 1, which comprises bending the bundles by entwining the ends of the bundles.

* * * * *